United States Patent [19]

Cosentino et al.

[11] Patent Number: 4,702,932
[45] Date of Patent: Oct. 27, 1987

[54] ELECTROSTATIC APPLICATION OF COATING MATERIALS

[75] Inventors: Roberto F. Cosentino; Franco B. Bonapace, both of Milan, Italy

[73] Assignee: Pharmindev Ltd., London, England

[21] Appl. No.: 20,212

[22] Filed: Feb. 27, 1987

Related U.S. Application Data

[63] Continuation of Ser. No. 689,933, Jan. 9, 1985, abandoned.

[30] Foreign Application Priority Data

Jan. 10, 1984 [GB] United Kingdom ............. 8400562

[51] Int. Cl.$^4$ ................................ B05D 1/04
[52] U.S. Cl. ........................... 427/33; 427/27; 427/212; 118/629; 118/630; 118/631; 118/634; 118/303
[58] Field of Search ............. 427/27, 33, 212; 118/629, 630, 631, 634, 303

[56] References Cited

U.S. PATENT DOCUMENTS

| | | | |
|---|---|---|---|
| 2,270,341 | 1/1942 | Ransburg | 427/35 |
| 2,644,769 | 7/1953 | Robinson | 427/27 |
| 3,649,408 | 3/1972 | Miller | 427/27 |
| 3,754,975 | 8/1973 | Spiller | 427/33 |
| 3,793,049 | 2/1974 | Probst | 427/27 |
| 3,900,583 | 8/1975 | Terry | 427/3 |
| 3,991,225 | 11/1976 | Blouin | 427/212 |
| 4,209,550 | 6/1980 | Hagenbach | 427/27 |
| 4,505,953 | 3/1985 | Chen | 427/212 |
| 4,520,754 | 6/1985 | Gange | 427/33 |

FOREIGN PATENT DOCUMENTS

| | | |
|---|---|---|
| 1441370 | 12/1968 | Fed. Rep. of Germany . |
| 1577729 | 9/1969 | Fed. Rep. of Germany . |
| 47188 | 10/1964 | Luxembourg . |

Primary Examiner—Richard Bueker
Attorney, Agent, or Firm—Cushman, Darby & Cushman

[57] ABSTRACT

A method of and apparatus for the electrostatic coating of poorly or non-conductive materials such as pellets seeds and powders, in which the product material is set in motion, preferably turbulent or agitating motion relative to at least one electrostatic coating material spraying device which is directed toward the moving product and has applied thereto a high potential difference whereby the coating material is given an electrostatic charge and an electrostatic charge of opposite polarity is induced on the product causing electrostatic attraction between the coating material and the product. The invention is applicable both to continous and batch production of coated material and preferably involves moving the product past the or each spraying device in a plurality of spraying passes. Charged atomised liquid and diffused powder may be sprayed onto the product either in sequence or at the same time.

14 Claims, 4 Drawing Figures

ELECTROSTATIC APPLICATION OF COATING MATERIALS

This is a continuation of application Ser. No. 689,933, filed Jan. 9, 1985, filed Jan. 9, 1985, which was abandoned upon the filing hereof.

This invention relates to the electrostatic application of a coating material on a product to be coated, for example, pellets, seeds and powders and other materials particularly materials used in the food, chemical and pharmaceutical industries.

It is known to coat poorly conductive or non-conductive materials with a powder or liquid by applying on the material to be coated, a high electrostatic charge of one polarity and on the powder or liquid a high charge of opposite polarity. This has been done in specially adapted handling equipment in which the material to be coated preferably in the form of pellets or seeds or particulate material is caused to fall freely in a thin cylindrical curtain around a central electrode to which a high voltage is applied. Electrostatic applications which may be either liquid or powder spraying devices are used to spray liquid or powder onto the material as it falls through the spraying chamber. The electrostatic charge of opposite polarity is applied to the coating material by connecting the applicators to a high voltage of opposite sign.

Electrostatic attraction between the coating material spray and the oppositely charged product material causes the product to become coated with the coating material. Such a method and apparatus are disclosed in European Patent Application Nos. 0085149 and 0127376.

One object of the present invention is to improve the uniformity of electrostatically applied coatings.

We have found that a high potential difference applied to coating material spraying means directed toward a product to be coated, causes an electrostatic charge opposite in polarity to the charge applied to the coating material, to be induced on the product. This avoids the need to provide in electrostatic coating apparatus, separate electrodes for applying an electrostatic charge to the product as described in the above mentioned European Applications.

According to one aspect of the present invention we propose a method for electrostatic application of a coating material on a product to be coated comprising imparting motion to the product, directing at least one electrostatic coating material spraying device toward the moving product and applying to the or each spraying device a high potential difference, whereby the coating material is electrostatically charged and an electrostatic charge of opposite polarity is induced on the product, causing electrostatic attraction between the coating material and the product.

Also according to this invention we propose apparatus for electrostatic application of a coating material on a product to be coated comprising at least one electrostatic coating material spraying device, and handling means for imparting motion to the product to be coated, the spraying device being mounted to direct a spray of the coating material onto the moving product and adapted for connection to a high voltage source whereby in use, an electrostatic charge is applied to the coating material and an electrostatic charge of opposite polarity is induced on the product to cause electrostatic attraction between the coating material and the product.

The resulting attraction of the electrostatically charged particles in relative motion, causes a generally uniform coating of the material.

The distribution of the particles of coating material in the form of an atomised liquid and/or diffused powders, having a microcharge imparted thereto by the applied PD (typically 30–90 kVolts), follows the lines of force according to the resultants of the electrode of the spraying device (whether a liquid atomiser or a powder diffuser) to the product, so as to establish a uniform distribution on the surface of the rapidly moving product material and to ensure uniformity of the whole mass.

Earthing of the material handling equipment at the same time avoids formation of counterionisation phenomena and therefore the build-up of possible dangerous residual charges.

Electrostatic spraying may be achieved, as stated above using, one or more liquid atomisers and/or one or more powder diffusers, these being supported by a bracket designed to facilitate mounting of the spraying device or devices in or relative to conventional material handling equipment. They are preferably adjustably mounted on the support bracket for example by means of an articulated joint, so as to be movable toward and away from the product in the handling means and/or to adjust the angle at which the spray of coating material impinges upon the product.

The electrostatic force applied to the atomised liquid is such as to produce a higher micronisation (for internal repulsion of the atomised particles having a charge of the same sign) than the micronisation which can be normally obtained with traditional systems, thus being able to produce particles of smaller size, which causes a higher drying and/or crystallising speed.

It is preferred to agitate or otherwise impart to the product, a turbulent motion so as to increase the exposure of the product to the coating material spray.

The motion imparted to the product by the handling equipment preferably during a plurality of spraying passes, ensures uniformity of distribution of the electrostatically applied particles on the entire product located in the area of electrostatic induction.

Electrostatic coating according to the present invention may be carried out using a coating pan, a fluidised bed, a conveyor belts dryer or any other mechanical or pneumatic material handling equipment imparting the desired motion to the material to be coated, whether in a continuous or batch process.

In one embodiment of the present invention the product is coated in a fluidised bed having a rotating plate or agitator imparting motion to the product during spraying of the coating material. In another embodiment the handling means comprises a concave product receiving surface which is movable upwardly whereby, in use, product deposited on a lower portion of the surface is repeatedly carried to an upper portion from which it falls back due to gravity.

In the case of a coating pan suitable for batch operation, the internal wall of the pan provides the said product receiving surface against which the product is flung under the action of centrifugal force and the product is transported in a succession of spraying passes past the or each spraying device mounted adjacent and directed into the pass.

For continuous production, the product may be conveyed down an inclined path within a rotatable drum or a series of such drums. A succession of spraying devices are disposed along the path of movement defined by the drums whereby a plurality of spraying passes are performed.

In cases of syrups or products with a high melting point, the liquid atomiser preferably has a return system preventing the blockage of conduits, the return system being controlled by a non-pulsating variable speed pump.

If desired, conduits supplying liquid and powder to the spraying devices may be made of a non-conductive and insulating material.

If the atomiser is of a rotary type, a circular air blade and/or electrostatic deflector may be provided to enable adjustment of the angle of atomisation.

The electrostatic powder diffuser, when required, operates in a similar manner; it is mounted on an articulated joint enabling adjustment of the distance from the product and the angle of incidence and is fed by a dehumified air fluidiser. The flow is controlled by a Venturi device.

The diffuser may have an extension head introduced in the handling apparatus in such a way as to avoid any interference by for example, counterionisation or deflection of the lines of force (repulsive phenomena), between atomiser and diffuser when both are used at the same time.

Also, in this case, the electrostatic diffuser enables proper regulation of the amount of powder to be applied and a uniform distribution of a thin layer on all the moving product material.

A system for blowing in and/or sucking possibly preburned warm or cold air or inert gas is added to the combined action of the liquid atomiser and powder diffuser, in order to avoid the danger of explosion when using solvents or special powders.

Advantages of the present invention include:
a considerable reduction in production time;
reduction of the time required for homogenisation of the liquid or the powder applied to the product, with a perfect distribution on the moving mass of the active substances, flavours, colours and so forth;
the avoidance of problems due to build-up of powders etc., in the working environment;
programmation and regulation, depending upon the particular production to be treated, of the times for spraying liquids, depositing powder, crystallizing syrup, icing sugar and drying the product.

The invention is also applicable to the coating of materials in closed coating pans, with inert gas circulation, for example, as necessary when working with pharmaceutical and other substances requiring strict control to avoid environmental pollution and safety hazards.

The operations of spraying liquid, depositing powder and drying the product either in sequence or offset, as required, may be programmed for different operation times and wholly automated.

A steel or copper coating pan may be also heated, insulated or provided with noise limiting devices.

In contrast with conventional techniques, the present invention enables the electrostatic coating of moving products not only at higher production rates but also to higher standards of quality having regard to the uniform distribution and homogenisation of the product to be coated with a film, layer or coat. Further, automation and programming with a greater flexibility of the working times is possible even with existing production machines such as coating pans.

Embodiments of the present invention will now be described by way of example with reference to the accompanying drawings in which.

Figure 1:
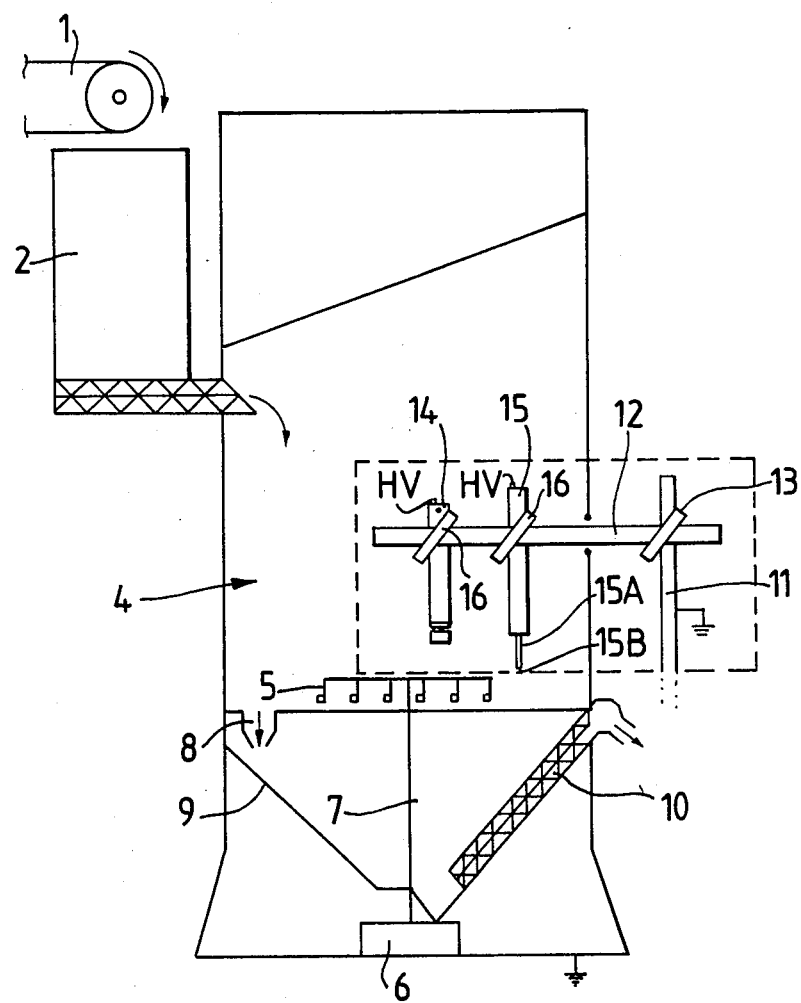
FIG. 1 is a schematic cross-sectional view of a fluidised bed dryer having electrostatic spraying devices for applying coating material to a product in the dryer.

FIG. 1 shows a fluidised bed dryer in which the product to be coated is fed by a coveyor belt 1 to a hopper 2 from which a delivery screw feeds the product into the dryer vessel 4. Circulation and agitation of the product within the dryer vessel is effected by a rotary plate agitator 5 driven by a suitable motor 6 through a drive shaft 7. As the product circulates it also moves radially outwardly until eventually, after treatment the product is discharged through the bottom opening 8 onto an inclined plate 9 and removed by the discharge screw 10. Inside the dryer vessel 4 there is the electrostatic deposition apparatus, comprising an earthed external supporting structure 11, connected by an articulated joint 13 to a holding bracket 12 on which one or more liquid atomisers 14 and/or one or more powder diffusers 15 are mounted by means of articulated joints 16. The atomisers 14 and/or diffusers 15 are connected to a high voltage power supply through the cable inlets HV and by virtue of the articulated joints are set to a desired angle so as to direct a spray of electrostatically charged liquid and/or powder onto the product circulating within the dryer. Liquid is sprayed first of all during an initial melting stage in which the product in its circulating and radially outward flow passes at least once and preferably a number of times, within range of the atomiser 14 spray. Before the wet product can begin to agglomerate it passes once or a number of times beneath the diffuser 15 to receive a coating of powder.

To avoid undue interference between the electric fields established by the two spraying devices 14 and 15 and to enable simultaneous operation thereof as described above, the diffuser 15 is fitted with an extension head 15A whereby the diffuser nozzle 15B is spaced from the atomiser 14 and disposed closer to the product circulating in the dryer so as also to improve induction.

Figure 2:
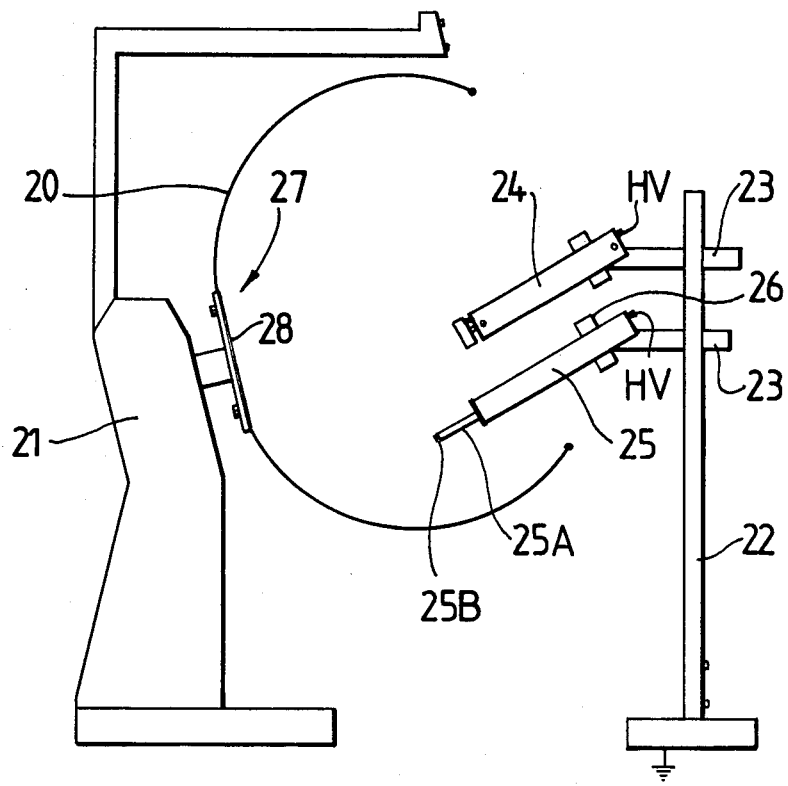
FIG. 2 is a schematic cross-section taken on the center-line of a coating pan having electrostatic spraying devices.

Referring now to FIG. 2, a coating pan 20 is supported by the usual frame 21 and the electrostatic deposition apparatus acts on the product agitated inside its chamber. As in the embodiment of FIG. 1, the apparatus comprises an earthed support structure 22 bearing brackets 23 on which one or more liquid atomisers 24 and/or one or more powder diffusers 25 are mounted by articulated joints 26, and are connected to a high power supply through the cable inlets HV.

After charging the coating pan 20 with a batch of product to be coated, the pan 20 is rotated. Due to centrifugal force, the product is flung outwardly against the walls of the pan so that it passes beneath or within range of the spraying devices 24 and 25 once per revolution of the pan.

During rotation of the pan, the base 27 thereof is exposed and to avoid disturbance of the electrostatic field and hence the induction on the product of an electrostatic charge opposite in polarity to the charge on the coating material, a suitable electrostatic screening material 28 is applied to the base 27.

The two devices 24 and 25 may be operated simultaneously as described with reference to the embodiment of FIG. 1. Alternatively, the atomiser 24 may be used alone during the initial melting stage, following which the wet product is sprayed with powder using the diffuser 25 alone.

At lower speeds of rotation, there is a tendancy for the product to tumble within the coating pan 20 so that the product repeatedly falls back into range of the spraying devices. This may also be achieved using a belt dryer such as shown in FIG. 3 and having an endless belt 30 on which the product is deposited and which is moved in a closed loop around pulleys 31 mounted on a support frame 32.

Figure 3:
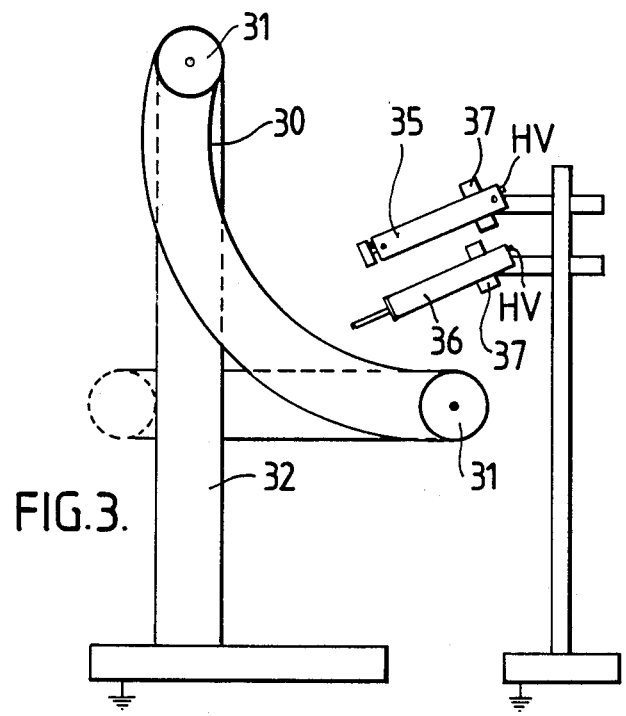
FIG. 3 is schematic cross-section of a belt dryer also having electrostatic spraying devices.

The product is raised by the belt and continually falls back as indicated by arrows in FIG. 3, into range of the electrostatic spraying devices 35 and 36 which are directed toward the product on the moving belt, whereby the product undergoes a plurality of spraying passes. As in the above described embodiments, the spraying devices comprise one or more liquid atomisers 35 and/or one or more powder diffusers 36, connected to a high voltage power supply through cable inlets HV and are adjustably mounted by articulated joints 37 on brackets 34 carried by an earthed supporting structure 33.

Figure 4:
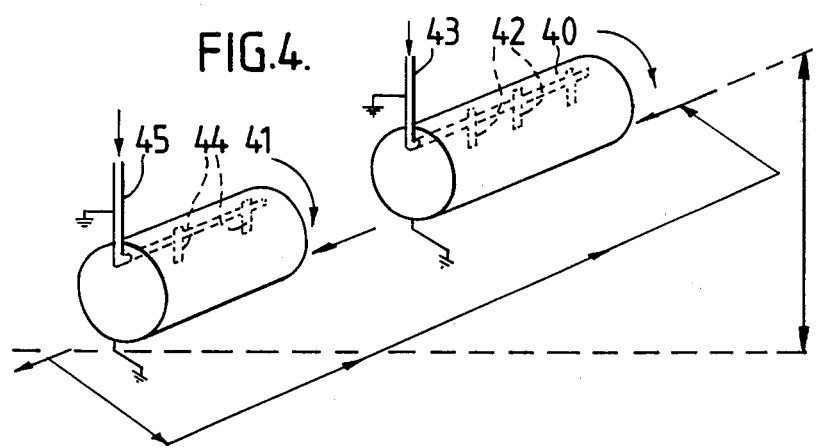
FIG. 4 is a schematic view of another embodiment of electrostatic coating apparatus.

FIG. 4 shows an arrangement of apparatus suitable for the continous production of coated materials. In this embodiment, the handling equipment comprises two rotary drums 40,41 defining an inclined feed path.

In the illustrated embodiment, the product is agitated as it is fed, in the first drum 40, past a succession (in this case three) of electrostatic liquid atomisers 42 which are adjustably mounted as described above in relation to FIGS. 1 to 3, on an earthed support structure 43 extending axially within the drum from one end thereof and through which liquid is fed to the individual atomisers.

When complete surface wetting of the product has been achieved and before the wet particles begin to agglomerate, the product is transferred by conveying means or a simple hopper (not shown) to the second drum 41. In this drum 41, the product is agitated as it is conveyed down the inclined path past a succession of electrostatic powder diffusers 44 which are adjustably mounted upon a support structure 45 similar to the structure 43 on which the atomisers 42 are mounted. The electrostatically deposited powder saturates the wet surface of the product (particles) to be coated and the motion imparted thereto by the drum or drums homogenises the coating until a uniform coating is obtained over the entire surface of the product.

Although two drums enabling multiple liquid spraying passes followed by multiple powder spraying passes, are shown it will be appreciated that the coating percentage may require the use of one or more liquid-powder systems arranged in series so that the spraying of liquid and powder can be repeated in sequence until the desired coating is obtained. Alternatively, the product may be recycled by any suitable feeding means such as a coveyer belt (indicated by arrows in FIG. 4), any number of times through any one, more than one or all of the drums, so as to undergo a predetermined sequence of electrostatic liquid and powder spraying operations necessary to achieve a desired coating.

The drum system is also provided with a hot or cold air or inert gas injection and/or suction system, possibly subjected to precombustion.

We claim:

1. A method for the electrostatic application of a substantially non-electrically conductive coating material to a substantially non-electrically conductive particulate product such as pellets, seeds and powdered materials, to be coated, comprising imparting turbulent motion to the product, directing at least one electrostatic coating material spraying device toward the product while the latter is in turbulent motion and applying to the or each spraying device a high potential diffrence whereby the coating material is electrostatically charged and an electrostatic charge of opposite polarity is induced on the product, without using separate charging electrodes or earth connections, to cause electrostatic attraction between the coating material and the product.

2. A method according to claim 1 wherein the product is moved past a succession of said spraying devices to perform a plurality of spraying passes.

3. A method according to claim 1 wherein the product is moved past the or each electrostatic spraying device at intervals to perform a plurality of spraying passes.

4. A method according to claim 3 wherein an electrostatically charged liquid and an electrostatically charged powder is sprayed onto the product.

5. Apparatus for the electrostatic application of a substantially non-electrically conductive coating material to a substantially non-electrically conductive particulate product such as pellets, seeds and powdered materials, to be coated, comprising at least one electrostatic coating material spraying device, and handling means for imparting turbulent motion to the product to be coated, the spraying device being mounted to direct a spray of the coating material onto the moving product and adapted for connection to a high voltage source, whereby in use, an electrostatic charge is applied to the coating material and an electrostatic charge of opposite polarity is included on the product without the use of separate charging electrodes or earth connections to cause electrostatic attraction between the coating material and the product.

6. Apparatus according to claim 5 wherein the or each spraying device is adjustably mounted on a support so as to be movable toward and away from the product in the handling means and/or to adjust the angle at which the spray of coating material impinges upon the product.

7. Apparatus according to claim 5 wherein the handling means comprises a concave product receiving surface which is movable upwardly whereby, in use, product deposited on a lower portion of the surface is repeatedly carried to an upper position from which it falls back due to gravity.

8. Apparatus according to claim 7 wherein the handling means comprises a coating pan, the internal wall of which forms the said product receiving surface and is rotatable so as to transport product contained therein in a succession of spraying passes past the or each said spraying device mounted adjacent and directed into the pan.

9. Apparatus according to claim 8 wherein a radially inner (with respect to the axis of rotation) metal surface of the coating pan, exposed when in use the product is displaced to the periphery of the pan under the action of centrifugal force, has applied thereto an electrostatic screening material.

10. Apparatus according to claim 5 wherein the handling means is adapted repeatedly to move the product past the or each spraying device to perform a plurality of spraying passes.

11. Apparatus according to claim 7 wherein the container comprises at least one cylindrical drum, the internal wall of which forms the said concave product receiving surface and having a product inlet at one end and a product outlet at the other end, the drum being rotatable about the axis thereof whereby during rotation product is conveyed from the inlet to the outlet.

12. Apparatus according to claim 5 comprising a succession of said spraying devices disposed along a path of movement defined by the product handling means, whereby, in use, a plurality of spraying passes are performed.

13. Apparatus according to claim 12 and having both an electrostatic liquid atomiser and electrostatic powder diffuser, past which the product is moved during each spraying pass.

14. Apparatus according to claim 5 wherein the product handling means is connected to earth.

* * * * *